UNITED STATES PATENT OFFICE.

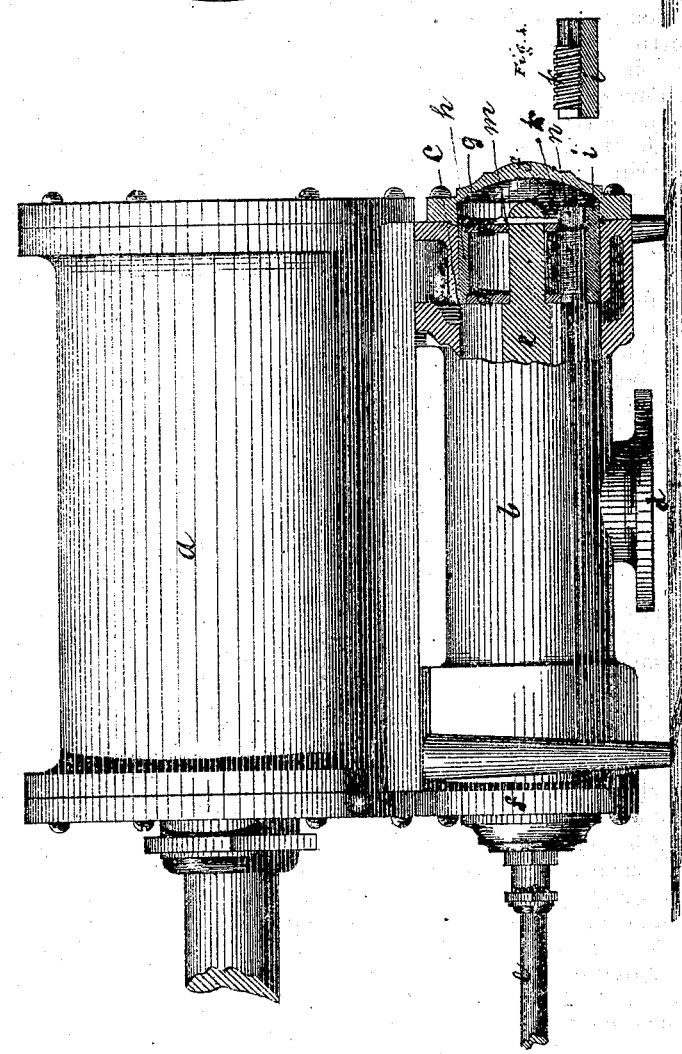

ROBERT W. HAMILTON, OF HARTFORD, CONNECTICUT.

IMPROVEMENT IN EXHAUST-VALVES.

Specification forming part of Letters Patent No. 116,707, dated July 4, 1871.

*To all whom it may concern:*

Be it known that I, ROBERT W. HAMILTON, of the city and county of Hartford and State of Connecticut, have invented certain new and useful Improvements in Steam-Exhaust Valves; and to enable others skilled in the art to make and use the same, I will proceed to describe, referring to the drawing, in which the same letters indicate like parts in each of the figures.

The nature of this invention consists in the construction and arrangement of valves or valve at the outer ends, or in a steam-exhaust chamber or cylinder, so that about one-third only of the length of the packing-ring or valve surface shall move or travel back and forth over the barless or shoeless exhaust-ports, and so that the packing-ring can be easily expanded and adjusted to the inside diameter of the chamber or cylinder.

In the accompanying drawing, Figure 1 is a side elevation of a steam-cylinder and a steam-exhaust chamber or cylinder connected thereto by steam-passages, a portion being removed to show the construction of the valve and the chamber in which it works, and its steam-exhaust ports. Fig. 2 is an external end view of the same, having the cap removed from the end of the exhaust-chamber. Fig. 3 is the cap which covers the end of the exhaust-chamber or cylinder. Fig. 4 shows the screw $k$ and incline wedge $i$ detached from the heads $g$.

$a$ represents the common steam-engine cylinder. $b$ is an exhaust-chamber or cylinder. $c$ are exhaust-ports or passages from the cylinder into the exhaust-chamber $b$. $d$ is the exit-passage. $e$ is the valve-stem or shaft, upon which they (the valves) are secured, and held in uniform position within their chambers. $f$ are caps which close up the ends of the exhaust-cylinder or chamber $b$, by means of bolts or screws in the common way. $g$ $g$ are spider-shaped open-work or solid heads, arranged and firmly secured upon the shaft $e$. $h$ is a packing-ring fitted closely over the heads $g$, and of sufficient diameter to fill the inside capacity of the exhaust-chamber. This ring is provided with depressions or rabbets at each end to receive the thickness of the heads. This ring is cut or severed to receive an incline sliding screw-threaded wedge, $i$, the lower portion or edge of which is fitted into bearings formed in the heads $g$. $k$ is a screw arranged between the valve-heads $g$ in suitable bearings formed in said heads, so that the threads of the screw will work in union with the threads of the wedge $i$. One end, $n$, of this screw is squared or slitted to receive a wrench or screw-driver for turning the screw from the outside of the valve-head. These heads, packing-ring, incline wedge, and screw are held in place and in uniform working condition upon the spindle $e$, within the exhaust-chamber, by a nut or pin, $m$, so that the fit of the ring $h$ to the diameter surface of the exhaust-chamber can be easily, quickly, and perfectly adjusted by turning the screw $k$ by its squared or slitted head $n$, which moves the incline wedge $i$ forward in the opening of the ring $h$, and causes it to expand, to fill or closely fit the chamber.

This valve requires but a small movement back and forth of about one-fourth to one-third of its length, sufficient so as to alternately open and close the exhaust-ports, thereby rendering it unnecessary to provide shoes or bars across the ports for the valve to ride upon, as are now commonly used, thus providing free unobstructed open ports.

$o$ are one or more orifices to allow the passage of leakage water or condensed steam into or out of the space between the outer head and the cap $f$ through the valve, and for the purpose of equalizing the pressure on each end of the valves.

I believe I have thus shown the nature, construction, and advantage of this invention so as to enable others skilled in the art to make and use the same therefrom.

What I claim, and desire to secure by Letters Patent, is—

The screw $k$, arranged inside of the valve, in combination with the screw-threaded wedge $i$, packing-ring $h$, and rod $e$, substantially as set forth.

ROBERT W. HAMILTON. [L. S.]

Witnesses:
E. W. BLISS,
JEREMY W. BLISS.